United States Patent Office 2,959,583
Patented Nov. 8, 1960

2,959,583

METHOD OF PURIFYING SULFATED POLYSACCHARIDES

John Doczi, Morristown, N.J., assignor to Warner-Lambert Pharmaceutical Company, Morris Plains, N.J., a corporation of Delaware No Drawing. Filed Jan. 23, 1959, Ser. No. 788,516

20 Claims. (Cl. 260—234)

This invention relates to a new and novel method of purifying sulfated polysaccharides and, more particularly, to a method of resolving heterogeneous sulfated polysaccharides into fractions of varying anticoagulant potency.

Anticoagulants are compounds which are capable of prolonging the clotting time of blood in man and other animals. They have been of great value to the medical profession and their applications have been widely studied and investigated for many years. The anticoagulant most widely used clinically is heparin, which was first prepared in 1916 from liver.

Efforts have been directed in recent years towards preparing synthetic anticoagulants having a structure analogous to that of heparin in order to obtain an anticoagulant by a method which would eliminate the complex and expensive extraction process required to separate heparin from liver and other tissues.

The exact chemical structure of heparin is not known. It is known, however, that heparin is a sulfated polysaccharide consisting of alternating units of glucosamine and glucuronic acid sulfated to varying degrees, and linked together to form a large molecule. Heparin is obtained from the conventional extraction process as a metal salt, such as heparin sodium, and is used clinically in this form. The various synthetic sulfated polysaccharide salts which have been investigated for their anticoagulant activity are structurally analogous to heparin, in that they are made up of chains of monosaccharide units linked together, with the hydroxyl radicals esterified with sulfate groups. Certain of the synthetic sulfated polysaccharide salts which have been investigated as anticoagulants also have primary amine groups which are sulfated to varying degrees.

Extracts from animal tissue containing heparin and reaction mixtures obtained in the production of synthetic sulfated polysaccharides contain various inactive constituents and a method for removing these inactive constituents without any loss in overall anticoagulant activity has long been sought.

For example, heparin is conventionally separated from crude tissue extracts as the barium salt which is then recrystallized and regenerated as heparin sodium. This method is disadvantageous because from 30 to 40 percent of the original activity is lost during formation and purification of the barium salt. A further disadvantage is that the barium salt of heparin is unstable and must be converted to the sodium salt immediately if further activity losses are to be avoided. This becomes a serious problem in commercial production of heparin since small batches must be purified, with resulting high labor and other manufacturing costs.

Both the natural anticoagulant heparin and the synthetic sulfated polysaccharide salts exist as a spectrum of moieties differing in molecular weight and degree of sulfation. The sulfated polysaccharide salts usually obtained from natural extracts, or synthetically, are heterogeneous mixtures and a satisfactory method of fractionating them to yield sulfated polysaccharide salt fractions having varying degrees of anticoagulant potency is highly desirable. In addition, synthetic sulfated polysaccharide salts appear to contain certain constituents having an undesirable toxicity and, accordingly, a method of purifying these sulfated polysaccharide salts to free them from toxic constituents has long been sought.

It is an object of this invention to provide a method of recovering a purified sulfated polysaccharide salt fraction from an impure reaction mixture or extract containing it with good yields.

A further object of this invention to provide a purification method for sulfated polysaccharides wherein the intermediates obtained in the purification method are stable and can be stored for long periods of time without loss in activity.

Another object of this invention to provide a method of resolving a heterogeneous mixture of anticoagulant sulfated polysaccharide salts into fractions of varying anticoagulant activity.

Yet another object of this invention is to provide a method of obtaining sulfated polysaccharide salt fractions having a high anticoagulant activity and free from inactive impurities.

Other objects and advantages of this invention will appear from the following detailed description.

In accordance with this invention I have found that impure sulfated polysaccharides may be purified by being treated with a quinine salt to form a precipitate comprising a sulfated polysaccharide-quinine salt fraction and the latter may then be regenerated to the corresponding purified sulfated polysaccharide salt formed without appreciable loss in anticoagulant activity. The sulfated polysaccharide-quinine salt formed is stable and may be stored for long periods of time without loss in activity, thereby facilitating efficient regeneraton to the sulfated polysaccharide salt.

In accordance with a preferred embodiment of this invention, the sulfated polysaccharide-quinine salt can be formed fractionally by the portion-wise addition of the quinine salt in such a way that the precipitated sulfated polysaccharide-quinine salt fraction formed by the addition of each portion of the quinine salt is removed prior to the addition of each succeeding portion. It has been found that the sulfated polysaccharide salt regenerated from the first formed sulfated polysaccharide-quinine salt fraction has a higher anticoagulant activity than that regenerated from the last formed fraction. Therefore, the fractional formation of sulfated polysaccharide-quinine salt fractions affords a method of separating a mixed sulfated polysaccharide salt into fractions of varying anticoagulant activity.

It has been found that the sulfated polysaccharide-quinine salt formed by either total or fractional precipitation is insoluble in water and in organic solvents but is soluble in an aqueous solution of a water miscible organic solvent. It has been further discovered that if the aqueous organic solvent solution of a sulfated polysaccharide-quinine salt is treated with a water immiscible organic solvent or is cooled, a precipitate is formed. The reprecipitation of a sulfated polysaccharide-quinine salt fraction from an aqueous organic solvent solution can be carried out repeatedly to form a number of subfractions which may then be regenerated individually into the corresponding sulfated polysaccharide salt subfractions which have a varying anticoagulant potency.

Therefore, by virtue of the differential solubility of sulfated polysaccharide-quinine salts, a further method of separating a heterogeneous sulfated polysaccharide salt into fractions of varying anticoagulant activity is provided in accordance with this invention. Fractional separation of sulfated polysaccharide-quinine salt fractions may be combined with fractional reprecipitation of each fraction into a number of sub-fractions, and the regeneration of each sub-fraction into the corresponding sulfated polysaccharide salt, thus providing a method for complete resolution of the original heterogeneous sulfated polysaccharide salt into a plurality of sub-fractions having a wide range of individual anticoagulant activities.

As starting materials in the present invention there may be used any of the sulfated polysaccharides and their derivatives which have activity in prolonging the clotting time of blood or which may be reacted further to form active compounds. Examples of such materials in addition to heparin are such sulfated polysaccharides as; sulfated chitosan, sulfuric acid esters of hyaluronic acid sulfate, chondroitin sulfuric acid, xylan sulfate and the like. These materials may all be directly extracted or prepared synthetically from naturally occurring materials by procedures well known in the art.

Heparin may be extracted from liver or other tissue such as beef lung tissue, by the method disclosed by Kuizenga et al., J. of Biological Chemistry, vol. 146, page 641 (1943).

Sulfated chitosan may be obtained from the material chitin which in turn may be obtained from the shells of various crustacea, such as crab shells and lobster shells by an extraction process. The deacetylation and partial depolymerization of chitin produces a material which is referred to as chitosan, which may then be sulfated to produce sulfated chitosan. Chitin may be deacetylated by treatment with acids or by action of enzymes such as chitinase found in the snail intestine. Preferably, deacetylation is carried out under alkaline conditions, such as heating in the absence of oxygen with a strong potassium hydroxide solution followed by heating in the presence of an oxidizing agent to effect optimal depolymerization. The resulting deacetylated and partially depolymerized chitin (chitosan) may then be sulfated by reaction with a sulfating agent such as sulfur trioxide in the presence of an organic base such as pyridine, triethylamine and the like. A method of deacetylating and partially depolymerizing chitin and sulfating the resulting chitosan is disclosed in U.S. Patent 2,832,766 to Wolfrom.

Hyaluronic acid can be extracted from pig and rabbit skin, and in addition can be isolated from the culture media of the mucoid strains of Streptococcus as disclosed by Kendall et al. in the Journal of Biological Chemistry, vol. 118, page 61 (1937). The extracted hyaluronic acid can be deacetylated and sulfated by the method of U.S. Patent 2,832,766 to yield a material which has anticoagulant properties.

Chondroitin sulfuric acid may be extracted from animal cartilage as disclosed by Meyer et al., J. Biol. Chem., 119, 507 (1937), and by the method of Strandberg, Acta. Phys. Scand., 21, 222–229 (1950).

Xylan is a polysaccharide made up of D-xylopyranose units linked together. Xylan may be extracted from beech wood and sulfated by the method described in Husemann et al., Z. Naturforsch., 1, 584–591 (1946).

The above listed starting materials are merely exemplary of the sulfated polysaccharides which may be purified by the method of the present invention. The various sulfated polysaccharides are normally obtained in the form of salts with metals or organic radicals in extracts or reaction mixtures and in this form are normally purified according to the method of this invention. For example, in the sulfation of chitosan with sulfur trioxide and pyridine, the sulfated chitosan is obtained from the reaction mixture as the pyridine salt. However, the method of this invention is equally applicable to the purification of sulfated polysaccharides in the free acid form.

In the case of sulfated polysaccharides which are prepared by chemical means, the starting material for use in the present invention should be freed from the sulfating reagent by washing. In the case of the natural anticoagulant, heparin, the extract of animal tissue is usually contaminated with various protein constituents which may interfere with the purification process of this invention. Accordingly, crude heparin should be treated with a proteolytic enzyme to hydrolyze substantially all the protein present as disclosed in U.S. Patent 2,571,679 to Butturini et al. Such enzymes as trypsin, papain, and the like, can be used with the hydrolysis being carried out, for example, with trypsin, at a pH of about 7.5 to about 8. Crude heparin is digested with the enzyme for sufficient time until a substantially negative test for protein is obtained, the resulting suspension is then filtered to remove suspended solids, and the clear filtrate containing heparin free from contaminating protein materials may then be purified in accordance with the method of the present invention.

The method of this invention depends upon the formation of a quinine salt of the sulfated polysaccharides to be purified. The source of quinine for use in the method of this invention is preferably a water soluble quinine salt, such as the hydrochloride, the nitrate and the like. The desired quinine salts which are only slightly soluble in water may be used provided they are more water soluble than the sulfated polysaccharide quinine salt produced. In general, however, the sparingly water soluble quinine salts are less convenient than the water soluble quinine salt, such as the hydrochloride and the nitrate referred to above.

The purification method of this invention is preferably carried out by treating a solution of the sulfated polysaccharide to be purified with a solution of the quinine salt. The sulfated polysaccharide in solution can either be totally precipitated with quinine or, alternately, the sulfated polysaccharide-quinine salt may be formed fractionally by the addition of successive portions of quinine. The successive formation of the sulfated polysaccharide-quinine salt as a plurality of fractions is particularly desirable since this technique affords a convenient means for resolving a mixed sulfated polysaccharide into fractions of varying anticoagulant activity.

In either case, the amount of quinine salt required for complete precipitation of the sulfated polysaccharide should initially be determined by trial precipitation on a small aliquot of the sulfated polysaccharide solution. The amount of quinine salt required may conveniently be determined by treating the aliquot with a known amount of the quinine salt which is well in excess of the amount required for total precipitation, followed by filtration to remove the polysaccharide-quinine precipitate and the determination of the excess of the quinine salt present by titration of the filtrate with a standard solution of alkali in aqueous alcohol, the endpoint being indicated by a sharp break in the titration curve at pH 9 to 10. In the case of total precipitation of the sulfated polysaccharide, it is preferred that at least a 10 percent excess of the quinine salt be used.

In the case of fractional formation of the sulfated polysaccharide-quinine salt a solution of the quinine salt required for total precipitation is added in successive portions to a solution of the sulfated polysaccharides. The amount of the sulfated polysaccharide to be precipitated with each portion may be determined in accordance with any desired plan. For example, the quinine salt solution can be added in four successive portions amounting to 20 percent, 20 percent, 30 percent, and 30 percent, respectively, of the amount of the quinine salt required for total precipitation. In carrying out the plan, the solution of sulfated polysaccharide is first treated with the initial portion of the quinine salt and the resulting mixture is filtered to remove the first precipitated fraction, the filtrate is then treated with the second portion and the process is repeated to prepare four sulfated polysaccharide-quinine salt fractions. It will, of course, be understood that the plan referred to above is merely illustrative and can be varied as desired. Thus, by the present fractional formation technique any number of sulfated polysaccharide-quinine salt fractions can be prepared.

Although the total precipitation is more conveniently and more easily carried out than the fractional precipitation as described above, the fractional precipitation method is preferred where sulfated polysaccharide fractions of the highest purity are desirable. It has been found that the sulfated polysaccharide salt fraction regenerated from the initial sulfated polysaccharide-quinine salt precipitate obtained in the fractional precipitation method has a higher degree of anticoagulant potency than the product obtained by total precipitation.

In accordance with this invention when the sulfated polysaccharide-quinine salt is formed by adding a quinine salt to a solution of the sulfated polysaccharide to be purified, the pH should be below that at which free quinine would precipitate, and accordingly should be on the acid side. A pH in the range of about 3.5 to about 5 is desirable since more complete formation of a sulfated polysaccharide-quinine salt appears to occur under these conditions. In addition, when the sulfated polysaccharide-quinine salt is formed in an acid medium, the precipitate is substantially free from ash producing materials. Strongly acidic conditions are generally to be avoided since they tend to promote activity loss.

The quinine salt of sulfated polysaccharides is a stable solid which may be stored for indefinite periods of time without decomposition. It has been found that treatment with quinine of a crude extract or reaction mixture containing a sulfated polysaccharide in accordance with this invention and thereafter regenerating a sulfated polysaccharide salt from the precipitated sulfated polysaccharide-quinine salt results in high degree of purification from the standpoint of anticoagulant activity without appreciable loss of overall activity. In the purification of crude tissue extracts containing heparin, by the method of this invention, the heparin sodium regenerated from the precipitated quinine salt of heparin is obtained with an activity yield of 90 to 100 percent. This represents a substantial improvement over the conventional purification through the barium salt where the activity yield is only about 60 to 70 percent. The term "activity yield" as used herein means the total units of anticoagulant activity in the product as a percentage of the units of anticoagulant activity present in the starting material.

The discovery that quinine salts of sulfated polysaccharides are insoluble in water and organic solvents but soluble in aqueous organic solvent solutions and, in addition, that quinine salts of sulfated polysaccharides can be fractionally reprecipitated by cooling their aqueous organic solvent solutions or by adding water immiscible organic solvents thereto is a novel and substantial advance in the art. Accordingly, an important feature of this invention is the resolution of sulfated polysaccharide-quinine salt fractions into sub-fractions by fractional reprecipitation from aqueous organic solvent solutions. The sub-fractions may then be regenerated to form the corresponding sulfated polysaccharide salt fractions which have varying anticoagulant activity. The most active regenerated fractions have an activity above anything heretofore obtainable.

The solvent system for the fractional reprecipitation may contain about 40 percent to about 95 percent organic solvent, and about 60 percent to about 5 percent water by weight. Useful organic solvents include the water soluble lower alcohols and ketones such as ethyl alcohol, isopropyl alcohol, methyl alcohol, acetone and the like. A solvent system made up of 70 to 80 percent ethyl alcohol and 30 to 20 percent water by weight has been found to be particularly effective.

Fractional reprecipitation in accordance with this invention is carried out from an aqueous organic solvent solution of a sulfated polysaccharide-quinine salt fraction obtained by either total or fractional formation as described above. Cooling of the solution induces formation of a precipitate which can be redissolved in an aqueous organic solvent solution and the process repeated. This technique can be repeated any number of times to yield a final precipitated sub-fraction and a number of mother liquor sub-fractions. These sub-fractions may be regenerated into the corresponding sulfated polysaccharide salt fractions having varying anticoagulant activity.

Alternately, the solution can be fractionally cooled in increments and each precipitated sub-fraction obtained then separated prior to cooling.

It has also been found that the addition of a water immiscible organic solvent to the aqueous organic solvent solution of a sulfated polysaccharide-quinine salt fraction induces the formation of a precipitated sub-fraction. Preferable water immiscible organic solvents are the lower alkyl ethers, such as dimethyl ether, diethyl ether and the like. The water immiscible organic solvent can be added in portions, with removal of each precipitated sub-fraction prior to the addition of each succeeding portion. The precipitated sub-fractions may be redissolved in aqueous organic solvent solutions and reprecipitated by cooling.

It is apparent that the maximum degree of resolution of a heterogeneous sulfated polysaccharide is obtained by fractional formation of sulfated polysaccharide-quinine salt fractions and the fractional reprecipitation of these individual fractions to provide a plurality of sub-fractions. The extent to which fractionation is to be applied to a particular sulfated polysaccharide may be varied as desired, depending on the activity of the starting material and the activity desired in the product. In some cases, total formation of a single sulfated polysaccharide-quinine salt, followed by regeneration to the corresponding sulfated polysaccharide salt may be indicated. However, where maximum anticoagulant activity is desired fractional reprecipitation of a fractionally or totally formed sulfated polysaccharide-quinine salt fraction is preferred. This is particularly true of the synthetic sulfated polysaccharides such as sulfated chitosan and xylan sulfate where the activity of the product obtained is too low for satisfactory use as an anticoagulant.

The sulfated polysaccharide-quinine salt fractions or sub-fractions obtained as described above are regenerated for recovery of the corresponding sulfated polysaccharide salt fractions therefrom. The regeneration of the sulfated polysaccharide from its quinine salt may conveniently be carried out by treatment of an aqueous organic solvent solution of the quinine salt with a basic reagent such as sodium hydroxide, potassium hydroxide, sodium acetate and the like. The quantity of base added is slightly in excess of the amount equivalent to the amount of quinine present in the sulfated polysaccharide-quinine salt. This can most conveniently be determined by slowly adding to the solution of quinine salt an aqueous alcoholic solution of the basic material until a sudden, rapid rise in the pH is observed, thus indicating complete regeneration of the quinine salt.

Alternately, regeneration can be carried out by treatment of the sulfated polysaccharide-quinine salt with a nonbasic salt such as, for example, sodium iodide which results in the formation of a precipitate of a sulfated polysaccharide-sodium salt, while quinine hydroiodide remains in solution. Other salts may be used provided that the metallic salt of the sulfated polysaccharide formed is insoluble and the regenerated quinine salt is soluble in the aqueous organic solvent.

In either method of regeneration, the sulfated polysaccharide salt is obtained as a precipitate which may be recovered by filtration or centrifugation, and then washed and dried. Where a basic reagent is used in the regeneration step, the sulfated polysaccharide salt may be separated from the liberated quinine salt by extraction with ether. The addition of ether results in a two-phase system in which the lower layer contains the metal salt of the regenerated sulfated polysaccharide in solution and the ether layer contains the quinine base. The sulfated polysaccharide salt may be precipitated from the lower layer by the addition of salts and solvents, for example, acetone, and the resulting precipitate recovered by filtration, washed and dried.

The anticoagulant activity of a material may conveniently be expressed in U.S.P. units per milligram as measured by the technique described in the U.S. Pharmacopoeia. Throughout the specification when the activity of a sulfated polysaccharide is given, it is in terms of U.S.P. units per milligram as measured by the standard U.S.P. technique.

The following examples are included to illustrate the various features of the present invention in the purification of heparin, sulfated chitosan, xylan sulfate and chondroitin sulfuric acid.

EXAMPLE I 320 g. of crude heparin (activity of 7.8 U.S.P. units per milligram) were added with stirring into 3200 ml. of water containing 32 ml. of chloroform as a bacterial inhibitor. The pH of the resulting mixture was adjusted from 6.0 to 8.4 with 30.6 ml. of twice normal sodium hydroxide solution, and a suspension of 1.6 g. of pancreatin (U.S.P. double strength) in 50 ml. of water was added with stirring. The resulting suspension was stirred for one hour, the pH was readjusted to 8.0 with 2.3 ml. of normal hydrochloric acid, 100 ml. of toluene was added to cover the surface of the liquid, and the mixture was placed in an incubator at 38° C. for 8 days. In the course of each day of this period, the mixture was stirred for an hour and the pH readjusted to 7.9. On the fourth day of incubation a further 1.6 g. of pancreatin suspended in 50 ml. of water was added. After 8 days of incubation the hydrolysate was found to give a negative test for protein by the trichloroacetic acid precipitation method (a strongly positive protein test had been obtained following the first day of incubation). The mixture was then centrifuged and the clear supernatant liquid was filtered through asbestos pads and the filtrate (5020 ml.) added to a solution of 450 g. of quinine hydrochloride dihydrate in 13 liters of water, whereupon a voluminous precipitate was obtained.

The quantity of quinine hydrochloride used is in excess of the quantity required for complete precipitation of all substances present in the hydrolysate, which are capable of forming water-insoluble quinine salts, the excess being empirically determined by trial on a small aliquot of the hydrolysate.

The precipitated quinine salt was collected and washed with water (about 5 liters) until free from chloride. The wet filter cake was then dissolved in about 2.5 liters of 75% by weight of ethanol in water, the resulting solution filtered, and heparin was regenerated as the sodium salt by treating the filtrate with 100 ml. of twice molar solution of sodium acetate containing 20 g. of sodium chloride. The mixture was then treated with one liter of ethanol and then allowed to stand at about 5° C. for 48 hours. The precipitated heparin sodium was collected by centrifugation and then was dissolved in water; the solution was filtered and 5 g. of sodium chloride were dissolved in the filtrate (520 ml.). Upon addition of the resulting solution to 9 liters of acetone, a precipitate of the purified heparin sodium was obtained which, after having been collected and dried under vacuum at 75° C., weighed 49.6 g. and had an anticoagulant activity of 52 U.S.P. units per milligram. This constituted a quantitative yield of the anticoagulant activity in the crude heparin starting material.

Further purification by reprecipitation from aqueous ethanol yielded an α fraction weighing 25.0 grams and having an activity of 93 U.S.P. units per milligram and a β fraction weighing 23.7 grams and having an activity of 12 U.S.P. units per milligram. The α fraction represented a yield of 93% of the anticoagulant activity in the crude heparin starting material.

Purification of heparin by quinine salt precipitation from an enzyme digested crude heparin hydrolysate as described in Example I indicated a markedly improved activity yield as compared to the conventional method of purification through the barium salt where yields average 60 to 70 percent.

EXAMPLE II 300 g. of heparin sodium whose activity was 93 U.S.P. units per mg. was dissolved in 6 liters of water. The pH of the solution was adjusted from 6.1 to 5.0 with 30 ml. of normal hydrochloric acid, then a heparin-quinine salt fraction Qa was precipitated by gradual addition of a solution of 106.5 g. of quinine hydrochloride dihydrate in 2130 ml. of water. This quantity of quinine hydrochloride corresponds to 20 percent of the amount calculated to be necessary for total precipitation. Qa was separated from the mother liquor by centrifugation, washed with about 2 liters of water and vacuum-dried first over phosphorus pentoxide at room temperature, then at 75° C. In a similar manner three succeeding fractions were obtained, viz., a fraction Qb with 20 percent, fraction Qc with 30 percent and fraction Qd also with 30 percent of the aforesaid calculated quantity of quinine hydrochloride, each precipitate obtained by the addition of the stated amount of quinine hydrochloride to the mother liquor after removal of the preceding fraction.

Each of the heparin-quinine fractions Qa, Qb, Qc and Qd was fractionally reprecipitated into 3 sub-fractions α, β and γ from 75 percent by weight ethanol in water solution to yield a total of twelve sub-fractions by the following procedure:

*Reprecipitation of Qa.*—Fraction Qa was dissolved in refluxing aqueous ethanol (10 ml. solvent per gram of fraction Qa) and filtered hot. The filter was washed with aqueous ethanol and the volume of the filtrate adjusted with aqueous ethanol to give a solution which contained 5.23 percent by weight of quinine. The solution was cooled to 4° C. and allowed to stand for 7 days.

A precipitate, herein identified as Qa1 for ready identification was then separated from the mother liquor ML/Qa1. Qa1 was redissolved in refluxing aqueous ethanol and the solution cooled as before, whereupon a precipitate Qa2 formed which was separated from the mother liquor ML/Qa2. This solution and precipitation was repeated to yield a final precipitate Qa3 which was separated from the final mother liquor ML/Qa3. Thus, in the reprecipitation of Qa, a final precipitate Qa3 and 3 mother liquors ML/Qa1, ML/Qa2 and ML/Qa3 were obtained.

The final precipitate was designated Qaα, ML/Qa3 and ML/Qa2 were combined and designated Qaβ and the initial mother liquor ML/Qa1 was designated Qaγ.

*Reprecipitation of Qb.*—Fraction Qb was dissolved and reprecipitated in the manner described above, except that 4 reprecipitations were carried out. Thus, a final precipitate Qb4 and 4 mother liquors ML/Qb1, ML/Qb2, ML/Qb3 and ML/Qb4 were obtained.

The final precipitate Qb4 was designated Qbα, ML/Qb4 and ML/Qb3 were combined and designated Qbβ, and ML/Qb2 and ML/Qb1 were combined and designated Qbγ.

*Reprecipitation of Qc.*—Fraction Qc was dissolved and reprecipitated in the manner described in connection with Qa to yield a final precipitate Qc3 and 3 mother liquors ML/Qc1, ML/Qc2 and ML/Qc3.

The final precipitate Qc3 was designated Qcα, ML/Qc3 and ML/Qc2 were combined and designated Qcβ and ML/Qc1 was designated Qcγ.

*Reprecipitation of Qd.*—Fraction Qd was reprecipitated in the manner described above, except that only 2 reprecipitations were carried out, yielding a final precipitate Qd2 and two mother liquors ML/Qd1 and ML/Qd2.

The final precipitate Qd2 was designated Qdα, ML/Qd2 was designated Qdβ and ML/Qd1 was designated Qdγ.

The twelve heparin-quinine salt sub-fractions were regenerated individually to form the corresponding heparin sodium fractions. Each sub-fraction was regenerated in a solution in 75 percent by weight ethanol in water solution. The regeneration procedure is described below and is illustrated by the following description of the regeneration of subfraction Qbα into the corresponding heparin sodium fraction bα.

Sub-fraction Qbα was dissolved in about 400 ml. of hot 75 percent ethanol. On cooling the resulting solution to room temperature precipitation occurred. However, addition of 6 ml. of pyridine completely cleared up the solution which was then titrated potentiometrically with a normal solution of sodium hydroxide in 75 percent ethanol, in a stream of nitrogen. The stoichiometric end point of the titration, indicated by a sharp break in the titration curve in the range of pH 9 to 11, was obtained after consumption of 26.5 ml. of normal sodium hydroxide. The resulting alkaline mixture (434.6 g.) containing regenerated heparin sodium fraction bα in suspension, was treated with 260 ml. of water and extracted with 1300 ml. of ether. The clear aqueous layer was separated, and extraction of the ether layer with water was continued until the ether layer was substantially colorless. Thereafter, all aqueous extracts were combined and re-extracted with ether until a negative test for quinine by Mayer's reagent for alkaloids (U.S.P.) was obtained. The quinine-free aqueous extract was then filtered and the pH of the filtrate adjusted to 6.8 with 1.8 ml., was made 40 percent (w./w.) on acetone and 1 percent on sodium iodide by addition of the 648 ml. of acetone and 77 ml. of a 10 percent solution of sodium iodide in acetone, whereupon fraction bα precipitated in a fibrous, readily filtrable form, which was filtered, washed first with acetone until free from iodide, then with ether, and finally dried at 75° C. for 4 hours under vacuum over phosphorus pentoxide. There was obtained, by this procedure, 4.51 g. of heparin sodium fraction bα. The mother liquor fractions Qbβ and Qbγ were regenerated by the above-described procedure to obtain heparin sodium fractions bβ and bγ, respectively. Similarly, the nine other heparin-quinine sub-fractions were regenerated to obtain the corresponding heparin sodium fractions.

The following table shows the intrinsic viscosity (a function of molecular weight) and the anticoagulant activity of each of the 12 regenerated heparin sodium fractions obtained as described above. Heparin sodium fraction aα is regenerated from heparin-quinine salt sub-fraction Qaα, etc.

Table I

| Heparin Sodium Fraction | Intrinsic Viscosity [1] | Activity—U.S.P. units/mg. |
| --- | --- | --- |
| aα | 0.163 | 151 |
| aβ | 0.143 | 148 |
| aγ | 0.104 | 116 |
| bα | 0.185 | 164 |
| bβ | 0.142 | 144 |
| bγ | 0.105 | 106 |
| cα | 0.145 | 143 |
| cβ | 0.120 | 123 |
| cγ | 0.093 | 82 |
| dα | 0.151 | 123 |
| dβ | 0.128 | 95 |
| dγ | 0.104 | 56 |

[1] Measured at 30° C. in 0.5 N NaCl solvent.

The results in Table I indicate the purification of heterogeneous heparin obtained by both the fractional formation of heparin-quinine salt, and by the fractional reprecipitation of the heparin-quinine salt fractions. It will be observed in the table that each group of sub-fractions α, β and γ show a progressively decreasing anticoagulant potency. The α fractions being derived from the final precipitate have the highest activity, whereas, the γ fractions derived from the initial mother liquor obtained in the first reprecipitation have the lowest potency of the three. It will also be observed that the a fractions, in general, have the highest activity, whereas, the d fractions have the lowest. This indicates that the heparin-quinine salt fraction obtained as the first precipitate in the fractional formation of the quinine salt contain the heparin with the highest anticoagulant activity. The exact mechanism to explain the purification obtained by the method of the present invention is not known, although there is a general correlation between intrinsic viscosity, which is a function of molecular weight, and anticoagulant activity, higher activity being associated with higher molecular weight.

The preparation of sulfated chitosan which may be purified by the method of the present invention is illustrated by the following example which shows the formation of chitosan from chitin, the purification of the crude chitosan formed and its sulfation to yield sulfated chitosan.

EXAMPLE III

A homogeneous paste was prepared from chitin (200 g.), potassium hydroxide (1540 g.) and water (460 cc.) in a Monel metal vessel and the latter was heated in an oil bath maintained at 125° C. for 24 hours while the reaction mixture was stirred in a nitrogen atmosphere. Thereafter, heating with stirring was continued at 125° C. for another 48 hours in an oxygen atmosphere. The reaction mixture was allowed to cool to about 95° C. and the melt was poured slowly into methanol (4 liters), with stirring; the mixture was heated to boiling and the insoluble material was removed by filtration and re-extracted four more times with boiling methanol in the same manner or until the pH of the methanol washings was not greater than 7.5.

The crude chitosan thus obtained (65% yield) is purified as follows: Crude chitosan (142 g.) was dissolved in 0.3 N hydrochloric acid (4770 cc.), the solution was filtered and the volume of the filtrate was made up to 7100 cc. with 0.3 N hydrochloric acid. The resulting solution was then treated with sufficient 6 N hydrochloric acid to make it 1.2 N with respect to hydrochloric acid. The precipitated chitosan hydrochloride was collected by centrifugation, washed with methanol (3×2840 cc.) to remove free hydrochloric acid, dissolved in water (7,100 cc.) and the resulting solution adjusted to pH 8.0 by the addition of a sufficient amount of a basic "sequestering agent" of the ethylenediamine tetraacetate type (e.g. 60 cc. of water added to 40 cc. of "47% Versene Fe-3 Specific" purchased from the Bersworth Chemical Co., Framingham, Massachusetts), in order to facilitate the removal of metallic impurities. The precipitate chitosan base was separated from the mother liquor, washed with methanol (3×2840 cc.) and then dissolved as the hydrochloride and reprecipitated at a hydrochloric acid normality of 1.2 in the manner described above. The reprecipitated chitosan hydrochloride was again separated, washed with methanol and redissolved in water; the solution thus obtained was adjusted to pH 8.0 by means of a 2 N methanolic solution of diethylamine. The resulting precipitate was separated, washed with methanol until free from chloride ion, washed with ether and finally dried at 75° C. under vacuum, over phosphorus pentoxide for 5 hours. The desired purified chitosan thus obtained in about a 40% purification yield, had the following analytical characteristics: reduced viscosity, 2.22; nitrogen, 8.42% by Kheldahl, 8.27% by Van Slyke.

A solution of chitosan (65.7 g.), obtained as described above, in 0.3 N hydrochloric acid (2190 cc.) was adjusted to pH 8.0 by the addition of a 2 N methanolic solution of diethylamine (600 cc.). The resulting gelatinous precipitate was separated by centrifugation and washed on a Buchner funnel with hot methanol until free from chloride ions. While still impregnated with methanol, the precipitate was added to dry pyridine (2000 cc.), and pyridine was distilled from the mixture, with stirring, under reduced pressure (about 30 mm.), until the water content (by Karl Fischer titration) of the distillate had dropped to the original value of the dry pyridine used. The residual material in the distillation pot was then treated with pyridine-SO₃ complex (390 g., prepared as described in Organic Syntheses, volume 2, 1946, page 173) followed by sufficient dry pyridine to make the concentration of pyridine —SO₃ in pyridine, 10% by weight. The reaction mixture was then heated in an oil bath, and the reaction temperature was kept at 75° C. for 63 hours. The solid reaction product was separated from the reaction mixture by decantation and filtration, and then washed with methanol (about 4 liters) until free from pyridine and pyridine —SO₃, washed with ether (1.5 liters) and finally dried over phosphorus pentoxide under vacuum, at room temperature, for 15 minutes. The product thus obtained (286 g.) was the crude pyridine salt of a sulfated chitosan.

The following example illustrates the purification of sulfated chitosan as prepared by the method of Example III, in accordance with the present invention.

EXAMPLE IV

The crude sulfated chitosan pyridine salt (286 g.) obtained as described in Example III was dissolved in water, and the filtered solution was added with stirring to a solution of quinine hydrochloride dihydrate (585 g.) in water (11.7 liters). The precipitated quinine salt of the sulfated chitosan was then filtered and twice re-pulped with water (2 liters) followed each time by filtration. The wet filter cake was then suspended in 95% ethanol, and a sufficient quantity of water was added to effect a clear solution at the reflux temperature. The solution was filtered and the water content thereof (28% by weight as determined by Karl Fischer titration) was adjusted to 25% by weight by addition of ethanol (453 g.). This aqueous ethanolic solution of the sulfated chitosan quinine salt was found to contain 6.42% of quinine by titration with 0.1 N sodium hydroxide in 75% aqueous ethanol.

To a solution of the quinine salt of the sulfated chitosan in 75% aqueous ethanol, obtained from 286 g. of the corresponding pyridine salt (as described above), there was added, with good stirring, ether to the first appearance of turbidity, followed by more ether equivalent to 10% of the volume used to produce the "cloud-point." From the mixture, after standing at room temperature for 4 days, there settled out a gelatinous precipitate (fraction Qa) which was separated by decantation. The mother liquor, by standing at 4° C. for 24 hours, produced a second precipitate (fraction Qb) which was separated from its mother liquor, which in turn gave a third fraction (Qc) upon addition of further ether followed by standing at 4° C. By repeating this procedure once more a fourth fraction (Qd) resulted. The volume of ether required to produce total precipitation from the remaining mother liquor was determined on a small aliquot of said mother liquor; thereafter the calculated volume of ether was added to said mother liquor in three equal increments, giving three further fractions (Qe, Qf and Qg). The final mother liquor was evaporated to dryness under vacuum giving an additional fraction (Qh). Each of the eight fractions, Qa to Qh, was resolved into two sub-fractions α and β by dissolving in 75% aqueous ethanol and producing precipitation with ether in the manner described above.

The resulting 16 sulfated chitosan-quinine salt sub-fractions were individually treated to regenerate sulfated chitosan as the sodium salt. The method used to regenerate each sub-fraction is illustrated by the following description of the procedure used to regenerate the fraction Qeβ to obtain the sodium salt of sulfated chitosan, fraction eβ.

Following the removal of the precipitated sub-fraction Qeα, the mother liquor (Qeβ) was adjusted to pH 10 with a normal solution of sodium hydroxide in 75% ethanol. The resulting suspension (580.5 g.) was treated with ether (1740 cc.) and water (350 cc.), followed by shaking, whereafter the ethereal phase was thrice re-extracted with water (3×58 cc.). All aqueous extracts were then combined, ether extracted until free from quinine (by Mayer's test for alkaloids), adjusted to pH 7.1 and the resulting solution (613 g.) made 40% by weight on acetone and 1% by weight on sodium iodide by addition of acetone (515 cc.) and a 10% solution of sodium iodide in acetone (61 cc.). The precipitate formed was centrifuged, re-dissolved in water and the resulting solution (97.5 g.) added to acetone (1270 cc.). The suspension this produced was treated with a 10% solution of sodium iodide in acetone (9.75 cc.) whereupon a fibrous precipitate separated. The latter was collected on a filter, washed with acetone until free from iodide ions, triturated with ether and finally dried under vacuum at 75° C. for 4 hours, whereupon there was obtained the desired sulfated chitosan sodium salt sub-fraction eβ corresponding to the quinine salt sub-fraction Qeβ. The above indicated procedure was applied to convert all aforesaid sixteen quinine salt sub-fractions to the corresponding sodium salt sub-fractions whose characterization is represented by the data shown in the following table.

Table II

| Fraction | Percent of Wt. of Unfractionated Product | Intrinsic Viscosity | Activity— U.S.P. units/ mg. |
|---|---|---|---|
| aα | 7.63 | 0.316 | 67 |
| aβ | 6.78 | 0.193 | 87 |
| bα | 3.79 | 0.247 | 76 |
| bβ | 5.40 | 0.180 | 71 |
| cα | 2.70 | 0.204 | 84 |
| cβ | 4.24 | 0.155 | 76 |
| dα | 0.95 | 0.194 | 81 |
| dβ | 2.46 | 0.143 | 74 |
| eα | 21.20 | 0.135 | 66 |
| eβ | 12.36 | 0.0850 | 63 |
| fα | 6.59 | 0.0550 | 54 |
| fβ | 9.26 | 0.0450 | 43 |
| gα | 1.14 | 0.0584 | 33 |
| gβ | 2.54 | 0.0512 | 35 |
| hα | 2.33 | 0.0368 | 20 |
| hβ | 0.32 | 0.0344 | 18 |

The results in Table II indicate the effectiveness of the method of this invention in resolving a heterogeneous sulfated chitosan into fractions of varying anticoagulant activity. As in the case of heparin, there is a general correlation between intrinsic viscosity (molecular weight) and anticoagulant activity, although with sulfated chitosan, the activity appears to be a parabolic function of molecular weight, reaching a maximum at an intermediate molecular weight range. It has been found in the case of synthetic anticoagulants, such as salts of sulfated chitosan, that the toxicity is a direct function of molecular weight, with the highest molecular weight fractions having the highest toxicity. Accordingly, the method of the present invention is particularly advantageous in obtaining fractions having the highest therapeutic index, that is the highest ratio of activity to toxicity.

The following example illustrates the purification of crude chondroitin sulfuric acid by formation of the quinine salt and regeneration thereof.

EXAMPLE V

A quantity of 20 g. of chondroitin sulphuric acid extracted from cartilage by the method of Strandberg, Acta. Phys. Scand., 21, 222–229 (1950), was dispersed in 200 ml. water, the pH adjusted to 8.0 and the solution digested with 0.1 g. pancreatin (2×U.S.P. strength) for eleven days. After filtration and heating to 75° C., 98.5 g. quinine HCl was dissolved in the solution resulting in the formation of a precipitate which was removed by centrifugation. The wet precipitate was dissolved by addition of 95 percent ethanol, which solution was filtered and potentiometrically titrated to a pH 10–10.5 end point with a 1N NaOH solution in 75 percent ethanol, as a result of which a rapidly settling precipitate formed.

The mother liquor was mixed with 3 times its volume of ether and 0.6 times its volume of water. On shaking the mixture a clear two phase separation was obtained. The initially formed precipitate was dissolved in the aqueous phase, and re-extracted with ether, at pH 9, until Mayer's test for quinine was negative. The quinine free extract was filtered, pH adjusted to 7 and made 40 percent on acetone.

The precipitate was redissolved in water and added for 15 volumes of acetone. The resulting precipitate was filtered, washed with acetone and ether and dried at 75° C. in vacuum to constant weight. A purified sodium salt of chondroitin sulfuric acid was obtained.

The chemical analysis of the crude starting material and the finished product are shown in the following table and compared with the analysis reported by Wolfrom in J.A.C.S., 65, 2077 (1943), for a highly purified salt of chondroitin sulfuric acid.

*Table III*

|  | Crude Starting Material | Purified Product | Reported by Wolfrom |
|---|---|---|---|
| Nitrogen | 7.99 | 2.85 | 2.74 |
| Sulfur | 3.65 | 5.46 | 5.85 |
| N-Acetyl |  | 7.97 | 8.37 |
| Ash [1] | 17.4 | 26.18 | 30.50 |

[1] Determination by the sulfuric acid method.

The results reported in Table III indicate the high degree of purification of chondroitin sulfuric acid as indicated by the similarity between the chemical analysis of the product purified by this invention and the analysis as reported in the literature.

The purified sodium salt of chondroitin sulfuric acid obtained in the example can be further sulfated by conventional techniques such as the method disclosed in U.S. Patent 2,832,766 to obtain a product having anticoagulant activity.

The following example illustrates the purification of inhomogeneous xylan sulfate in accordance with this invention to yield fractions of varying anticoagulant activity.

EXAMPLE VI

A quantity of 500 grams of xylan sulfate (extracted from beechwood by the method of Husemann et al., Z. Naturforsch., 1, 584–591 (1946)) having an anticoagulant activity of 26 U.S.P. units/mg. was dissolved in 10 liters of water and the pH adjusted to 4.8. To the solution was added 470 grams of quinine $HCl \cdot 2H_2O$ as a 5 percent solution in water. This constituted 40 percent of the amount required for total precipitation as determined by test on a small aliquot of the solution. The precipitated xylan sulfate-quinine salt, $Qa$, was separated by centrifugation and 470 grams of quinine $HCl \cdot 2H_2O$ was added to the mother liquor. The second precipitated fraction $Qb$ was removed and 235 grams of quinine $HCl \cdot 2H_2O$ was added to the mother liquor, forming a third precipitated fraction $Qc$ which was recovered by centrifugation. The third mother liquor was discarded.

The fractional formation of xylan sulfate-quinine salts as described above yielded 3 fractions, $Qa$, $Qb$ and $Qc$, with 40 percent, 40 percent, and 20 percent respectively of the theoretical amount of quinine $HCl \cdot 2H_2O$ required for total precipitation, respectively.

The three fractions $Qa$, $Qb$, $Qc$ were resolved into sub-fractions by reprecipitation from aqueous ethanol by the following procedure:

*Reprecipitation of $Qa$.*—Xylan sulfate-quinine salt fraction $Qa$ was dissolved in aqueous ethanol containing 76 percent ethanol by weight and the solution was cooled to 4° C. A precipitate $Qa1$ was obtained and separated from the mother liquor $ML/Qa1$. The precipitated sub-fraction $Qa1$ was dissolved in aqueous ethanol (76 weight percent ethanol) and cooled to obtain precipitate $Qa2$ which was separated from the mother liquor $ML/Qa2$. The reprecipitation was repeated twice more to yield a precipitate $Qa4$ and a total of four mother liquors, $ML/Qa1$, $ML/Qa2$, $ML/Qa3$, $ML/Qa4$.

The first three mother liquor fractions were combined and evaporated to dryness to obtain a sub-fraction designated $Qa'$. This sub-fraction was reprecipitated five times from aqueous ethanol (76% ethanol by weight) as described above to obtain a final precipitate $Qa'5$ and 5 mother liquors, $ML/Qa'1$, $ML/Qa'2$, $ML/Qa'3$, $ML/Qa'4$, $ML/Qa'5$.

The first four mother liquors were combined and evaporated to dryness to obtain a sub-fraction designated $Qa''$. This sub-fraction was reprecipitated once from aqueous ethanol (76% ethanol by weight) to yield a precipitate $Qa''1$ and a mother liquor $ML/Qa''1$.

Accordingly, from the xylan sulfate-quinine salt fraction $Qa$ there were obtained the following sub-fractions: $Qa4$, $ML/Qa4$, $Qa'5$, $ML/Qa'5$, $Qa''1$ and $ML/Qa''1$. These xylan sulfate-quinine salt sub-fractions were designated $Qa\alpha$, $Qa\beta$, $Qa'\alpha$, $Qa'\beta$, $Qa''\alpha$, and $Qa''\beta$, respectively.

*Reprecipitation of $Qb$.*—Xylan sulfate-quinine salt fraction $Qb$ was dissolved in aqueous ethanol (76% ethanol by weight) and the solution cooled to room temperature, whereupon sub-fraction $Qb\alpha$ separated out as a precipitate. After removal of the precipitate by centrifugation, the mother liquor was cooled to −10° C. The resulting precipitate $Qb\beta$ was separated from the mother liquor which was designated $Qb\gamma$.

Accordingly, from fraction $Qb$ there were obtained three xylan sulfate-quinine salt sub-fractions $Qb\alpha$, $Qb\beta$, and $Qb\gamma$.

Xylan sulfate-quinine salt fraction $Qc$ was not reprecipitated.

Each of the sub-fractions obtained as described above as well as the fraction $Qc$ were regenerated to the corresponding xylan sulfate-sodium salt sub-fraction by the following procedure:

The regeneration of each sub-fraction was carried out in an aqueous ethanol solution (76% ethanol by weight), the volume adjusted to give a quinine concentration of about 0.1 N. The solution was placed in a separatory funnel and mixed with 20 percent of its volume of 1 M aqueous sodium acetate, followed by the addition of twice its volume of ether. The mixture was shaken thoroughly and allowed to separate into a viscous aqueous lower phase containing the regenerated xylan sulfate sodium salt in a high concentration and an upper ether phase.

The aqueous phase was separated, its pH adjusted to 8.5 to 9 with 1 N NaOH and re-extracted with ether until an aliquot of the extracted solution gave a negative test for quinine with Mayer's reagent. The pH of the quinine free solution was adjusted to 6.5 to 7.0 with acetic acid, filtered, and the product precipitated as a viscouse concentrate by the addition of acetone to 60 percent concentration. The concentrate was mixed with 15 volumes of acetone and the precipitate recovered by filtration. The solids were washed three times with methanol, twice with ether and dried at 75° C. under vacuum for four hours.

The results of the purification described above are shown in the following table in terms of activity and yield.

Table IV

| Xylan Sulfate Sodium Salt Fractions | Activity (U.S.P. units/mg.) | Yield—percent of input | |
|---|---|---|---|
| | | weight | units |
| Starting Material | 26 | 100 | 100 |
| aα | 54 | 3.9 | 8.1 |
| aβ | 50 | 8.5 | 16.4 |
| a'α | 57 | 0.3 | 0.6 |
| a'β | 64 | 0.7 | 1.8 |
| a''α | 36 | 4.7 | 6.5 |
| a''β | 21 | 15.5 | 12.5 |
| bα | 24 | 17.3 | 16.0 |
| bβ | 20 | 6.6 | 5.1 |
| bγ | 18 | 9.9 | 6.8 |
| c | 7 | 1.8 | 0.5 |
| | | 69.5 | 74.3 |

The results presented in Table IV establish the efficiency of the method of this invention in resolving a heterogeneous xylan sulfate into sodium salt fractions having varying anticoagulant potency. It will be observed that the $a$ fractions have, in general, the highest activity. Approximately one-third of the total activity present in the starting material is recovered in fractions having a higher activity than that of the starting material.

The foregoing examples are merely illustrative of the method of this invention in purifying sulfated polysaccharides. It will be apparent that this invention is adaptable to the purification of other sulfated polysaccharides to obtain fractions of high anticoagulant activity.

This application is a continuation-in-part of my copending application, S.N. 308,946, filed September 10, 1952, now abandoned.

It is understood that the foregoing detailed description is given merely by way of illustration and that many variations may be made therein without departing from the spirit of this invention.

Having described my invention, what I desire to secure by Letters Patent is:

1. A method of purifying a crude sulfated polysaccharide which has activity in prolonging the clotting time of blood to yield a fraction of high anticoagulant activity which comprises treating an aqueous acid solution of said sulfated polysaccharide with a water-soluble quinine salt to form a sulfated polysaccharide-quinine salt precipitate and converting said sulfated polysaccharide-quinine salt to a sulfated polysaccharide metal salt.

2. A method according to claim 1 wherein said aqueous acid solution has a pH between about 3.5 and about 5.

3. A method according to claim 1 where said sulfated polysaccharide is heparin.

4. A method according to claim 1 where said sulfated polysaccharide is sulfated chitosan.

5. A method according to claim 1 where said sulfated polysaccharide is chondroitin sulfuric acid.

6. A method according to claim 1 where said sulfated polysaccharide is xylan sulfate.

7. In a method of purifying crude heparin which comprises digesting an aqueous solution of said crude heparin with a proteolytic enzyme and isolating heparin from the hydrolysate, the improvement which comprises treating said hydrolysate with a water soluble quinine salt to precipitate a heparin-quinine salt therefrom and converting said heparin-quinine salt to a heparin-metal salt.

8. In a method of preparing a sulfated polysaccharide which comprises adding a sulfating agent to chitosan in the presence of an organic base, heating the reaction mixture, and separating the sulfated polysaccharide from the reaction mixture as a crude salt, the purification of said crude salt by converting it into the corresponding quinine salt, isolating said quinine salt and then converting the said quinine salt into a corresponding alkali metal salt of the sulfated polysaccharide.

9. A method of resolving a heterogeneous sulfated polysaccharide which has activity in prolonging the clotting time of blood into fractions of varying anticoagulant activity which comprises forming a heterogeneous sulfated polysaccharide-quinine salt of said heterogeneous sulfated polysaccharide, isolating a series of fractions of sulfated polysaccharide-quinine salts by fractional reprecipitation of said heterogeneous sulfated polysaccharide-quinine salt from an aqueous solution of a water miscible organic solvent comprising about 40 to about 95 percent organic solvent by weight and converting each of said fractions into a corresponding sulfated polysaccharide-metal salt fraction.

10. A method of resolving a heterogeneous sulfated polysaccharide which has activity in prolonging the clotting time of blood into fractions of varying anticoagulant activity which comprises treating an aqueous solution of said heterogeneous sulfated polysaccharide at a pH of between about 3.5 and about 5 with a water soluble quinine salt to form a heterogeneous sulfated polysaccharide-quinine salt precipitate, dissolving said precipitate in an aqueous solution of a water miscible organic solvent comprising about 40 to about 95 percent organic solvent by weight, isolating a series of fractions of sulfated polysaccharide-quinine salts by fractional reprecipitation from said solution and converting each of said fractions into a corresponding sulfated polysaccharide-metal salt fraction.

11. A method according to claim 10 wherein said aqueous solution of a water miscible organic solvent is an aqueous solution of ethanol containing 70 to 80 percent ethanol by weight.

12. A method according to claim 10 wherein said fractional reprecipitation is carried out in a sequence of steps comprising cooling the aqueous organic solvent solution of the heterogeneous sulfated polysaccharide-quinine salt, separating a first precipitated fraction from the mother liquor, redissolving the first precipitated fraction in an aqueous solution of an organic solvent comprising about 40 to about 95 percent organic solvent by weight to form a second solution, cooling said second solution, separating a second precipitated fraction from the mother liquor and repeating said sequence, the final precipitated fraction and the individual mother liquors resulting from said sequence of steps constituting said series of fractions of sulfated polysaccharide-quinine salts.

13. A method according to claim 10 wherein said fractional reprecipitation is carried out in a sequence of steps comprising adding a first portion of a lower alkyl ether to the aqueous organic solvent solution of the heterogeneous sulfated polysaccharide-quinine salt, separating a first precipitated fraction from the solution, adding a second portion of a lower alkyl ether to the solution after removal of the first precipitated fraction, separating a second precipitated fraction from the solution and repeating said sequence, the individual precipitated fractions and the final solution remaining after separation of the last precipitated fraction constituted said series of fractions of sulfated polysaccharide-quinine salts.

14. A method according to claim 13 wherein said individual precipitated fractions prior to regeneration into the corresponding sulfated polysaccharide-metal salt fractions are each dissolved in an aqueous solution of an organic solvent comprising about 40 to about 95 percent organic solvent by weight, each resulting solution is cooled and each precipitated sulfated polysaccharide-quinine salt sub-fraction is separated from each mother liquor which comprises a sulfated polysaccharide-quinine salt sub-fraction in solution.

15. In a method of preparing a sulfated polysaccharide which comprises preparing a reactive form of chitosan from an aqueous medium, washing the precipitate with alcohol, removing residual water and alcohol from the precipitate by codistillation with an organic base, adding a sulfating agent to said reactive form of chitosan in the presence of an organic base, heating the reaction mixture, separating out sulfated polysaccharides as a mixture of crude salts; the purification of said crude salts by converting them to a mixture of the corresponding quinine salts, isolating a series of fractions of quinine salts by fractional reprecipitation of said mixture of quinine salts, and converting each of said quinine salt fractions into a corresponding alkali salt fraction.

16. A method of resolving a heterogeneous sulfated polysaccharide which has activity in prolonging the clotting time of blood into fractions of varying anticoagulant activity which comprises treating an aqueous acid solution of said heterogeneous sulfated polysaccharide with successive portions of a water soluble quinine salt to form a series of sulfated polysaccharide-quinine salt fractions and converting each of said fractions into a corresponding sulfated polysaccharide-metal salt fraction.

17. A method according to claim 16 wherein said aqueous acid solution has a pH between about 3.5 and about 5.

18. A method of resolving a heterogeneous sulfated polysaccharide which has activity in prolonging the clotting time of blood into fractions of varying anticoagulant activity which comprises treating an aqueous acid solution having a pH of about 3.5 to about 5 of said heterogeneous sulfated polysaccharide with successive portions of a water soluble quinine salt to form a series of sulfated polysaccharide-quinine salt fractions, isolating a series of sub-fractions of sulfated polysaccharide-quinine salts by fractional reprecipitation of each of said fractions from an aqueous organic solvent solution comprising about 40 to about 95 percent organic solvent by weight and converting each of said sub-fractions into a corresponding sulfated polysaccharide-metal salt fraction.

19. A method according to claim 18 wherein said aqueous organic solvent solution is an aqueous solution of ethanol containing 70 to 80 percent ethanol by weight.

20. A method of resolving heterogeneous heparin into fractions of varying anticoagulant activity which comprises dissolving said heterogeneous heparin in water, adjusting the pH of the solution to about 3.5 to about 5 by the addition of acid, adding successive portions of a water soluble quinine salt to the acidified solution of heterogeneous heparin to form a series of heparin-quinine salt fractions, dissolving each of said fractions in an aqueous solution of ethanol containing 70 to 80 percent ethanol by weight, isolating a series of heparin-quinine salt sub-fractions from each of said heparin-quinine salt fraction solutions by a sequence of steps comprising cooling the solution, separating a first precipitated sub-fraction from the mother liquor, redissolving the precipitated sub-fraction in an aqueous ethanol solution containing 70 to 80 percent ethanol by weight, cooling the solution of said first precipitated sub-fraction, separating a second precipitated sub-fraction from the mother liquor and repeating said sequence, the last precipitated sub-fraction and the individual mother liquors resulting from said sequence of steps constituting said series of sub-fractions of heparin-quinine salts, and converting each of said sub-fractions into a corresponding heparin-alkali metal salt.

References Cited in the file of this patent

UNITED STATES PATENTS

| | | |
|---|---|---|
| 2,040,879 | Rigby | May 19, 1936 |
| 2,508,433 | Snyder | May 23, 1950 |
| 2,832,766 | Wolfrom | Apr. 29, 1958 |